United States Patent [19]

Bobo

[11] Patent Number: 5,686,511
[45] Date of Patent: Nov. 11, 1997

[54] ESTERIFYING EPOXY RESIN WITH CARBOXYL POLYMER AND QUENCHING

[75] Inventor: William S. Bobo, Louisville, Ky.

[73] Assignee: The Valspar Corporation, Minneapolis, Minn.

[21] Appl. No.: 673,285

[22] Filed: Jun. 28, 1996

[51] Int. Cl.[6] .............................. C08K 5/04; C08L 33/02; C08L 63/02
[52] U.S. Cl. ............................... 523/412; 525/119
[58] Field of Search ............................... 523/412; 525/119

[56] References Cited

U.S. PATENT DOCUMENTS

| | | | |
|---|---|---|---|
| 3,943,187 | 3/1976 | Wu | 260/831 |
| 3,960,979 | 6/1976 | Khanna | 260/834 |
| 3,997,694 | 12/1976 | Wu | 428/418 |
| 4,105,614 | 8/1978 | Davis et al. | 260/834 |
| 4,128,515 | 12/1978 | Tobias et al. | 528/112 |
| 4,212,776 | 7/1980 | Martinez et al. | 428/418 |
| 4,247,439 | 1/1981 | Matthews et al. | 260/29.6 NR |
| 4,303,488 | 12/1981 | Seiler et al. | 204/181 R |
| 4,308,185 | 12/1981 | Evans et al. | 525/523 |
| 4,341,682 | 7/1982 | Tobias | 525/531 |
| 4,423,165 | 12/1983 | Harper et al. | 523/409 |
| 4,442,246 | 4/1984 | Brown et al. | 525/530 |
| 4,444,923 | 4/1984 | McCarty | 525/108 |
| 4,446,260 | 5/1984 | Woods et al. | 523/409 |
| 4,480,058 | 10/1984 | Ting et al. | 525/530 |
| 4,483,673 | 11/1984 | Murai et al. | 431/342 |
| 4,547,535 | 10/1985 | Brown et al. | 525/530 |
| 4,585,813 | 4/1986 | Brown et al. | 525/530 |
| 5,264,469 | 11/1993 | Mysliwczyk et al. | 523/412 |

FOREIGN PATENT DOCUMENTS

| | | |
|---|---|---|
| 63-35441 | 2/1988 | Japan . |
| 8-27415 | 1/1996 | Japan . |

*Primary Examiner*—Robert E. Sellers
*Attorney, Agent, or Firm*—Merchant, Gould, Smith, Edell, Welter & Schmidt, P.A.

[57] ABSTRACT

A method of preparing a water-dispersible epoxy resin coating composition comprises:

(a) Reacting an epoxy polymer with a carboxyl bearing polymer in the presence of an esterification catalyst;

(b) Quenching with an excess of tertiary amine before the esterification reaction is completed; and (c) adding water to form an aqueous dispersion.

15 Claims, No Drawings

ESTERIFYING EPOXY RESIN WITH CARBOXYL POLYMER AND QUENCHING

BACKGROUND OF THE INVENTION

Coating compositions based on the reaction product of a carboxyl bearing polymer, an epoxy resin and a tertiary amine are known to be useful in coating various substrates. Such compositions are generally prepared by reacting the carboxyl functional polymer with the epoxy resin in the presence of the amine, which serves as a catalyst. The desired product is a coating composition that is readily dispersed in water and which forms a durable coating, but these results can be difficult to achieve.

One problem that commonly arises during attempted preparation of a water dispersible coating composition is formation of an extremely high molecular weight product that will not disperse in water. Such a product may result, for example, if too many ester linkages are formed between the epoxy resin and the carboxyl functional polymer, or if both oxirane groups of the epoxy resins are allowed to react with carboxyl groups.

Ideally, the resulting coating composition will be easily dispersible in water and readily applied to the substrate to be coated, such as a beverage can. Once applied, the coating composition should remain smooth and even, without blistering or sagging. The coating must also be resistant to a number of substances that it may contact. In the case of coated beverage cans, this may include substances such as cola, beer, fruit juices, soft drinks and the like.

A number of attempts have been made in the prior art to prepare a water dispersible coating composition from an epoxy resin and a carboxyl functional polymer. Matthews et al., in U.S. Pat. No. 4,247,439, describe a water-borne coating composition prepared by using a tertiary amine in large excess in the reaction mixture. This excess of amine provides a resin coating composition wherein quaternary ammonium salt linkages almost completely eliminate ester linkages. This process is carried out in an aqueous medium.

Brown et al., U.S. Pat. No. 4,442,246 describe non-gelled aqueous coating compositions prepared with little water present, that use a defunctionalized epoxy resin and an excess of amine over epoxy groups. In this way, quaternary ammonium groups tend to predominate over ester groups, and gel formation caused by over-esterification is avoided. The resulting product is neutralized with amine, providing a mixture of ester and quaternary ammonium linkages between the polymers.

Ting et al., U.S. Pat. No. 4,480,058, provide an aqueous epoxy ester emulsion prepared by esterifying a carboxyl bearing polymer with an epoxy resin in an organic solvent. This process also makes use of a defunctionalized epoxy resin.

The principal drawback of the prior art processes is a lack of control over the ester/quaternary ammonium ion/carboxyl ion complex. This lack of control can lead to gelation or the formation of products which are difficult to apply and/or have poor coating characteristics. There is a need for a water dispersible coating composition that may be prepared without risk of gelation, that is easily applied and provides a strong, chemical resistant coating.

SUMMARY OF THE INVENTION

The invention provides a method of preparing a water dispersible coating composition composed of reacting an epoxy resin with a carboxyl bearing polymer in the presence of an esterification catalyst and quenching the reaction mixture before the esterification reaction is completed. The invention also provides a water-dispersible coating composition prepared by reacting an epoxy resin with a carboxyl bearing polymer in the presence of an esterification catalyst and quenching the reaction mixture before the esterification reaction is completed.

The water-dispersible coating composition of the invention has excellent stability and coating strength and is easily applied to the chosen substrate.

The compositions of the invention are generally prepared by reacting an epoxy resin with a carboxyl bearing polymer and quenching the reaction with an excess of amine before the esterification reaction is completed. Monitoring the progress of the reaction allows one to determine the appropriate time to quench the reaction. The method of the invention permits the number of ester linkages to be more carefully controlled and also allows the use of di-functional epoxy resins without the need to defunctionalize the oxirane groups. The method also provides products that contain a higher proportion of epoxy-ester linkages than previously possible. The procedure further provides a coating composition that is readily dispersible in water, has desirable viscosity, and is stable.

As used herein, the phrase "coating composition" describes a water-dispersible coating composition prepared by the reaction of a carboxyl bearing polymer and an epoxy resin. Unless otherwise specified, the epoxy resin used in the method of the invention has an average epoxy functionality of about 2.

In the method of the invention the esterification reaction does not proceed to completion, as this will result in the formation of a gel. By "partially reacted" it is meant that of the total original oxirane groups, the fraction esterified is below the amount that will result in the reaction reaching the gel point.

After partial reaction of the epoxy resin and carboxyl bearing polymer mixture, the reaction mixture is quenched. This may be effected in one of two ways: by quenching with a solution of water and amine or by neutralizing with amine, then adding water to disperse the composition.

The method of the invention is useful in the preparation of water-dispersible coating compositions that are easily applied and have good coating characteristics, such as stain and chemical resistance and durability.

DETAILED DESCRIPTION OF THE INVENTION

The Carboxyl Bearing Polymer

In the method of the invention, a carboxyl bearing polymer and an epoxy resin are allowed to react in an organic solvent in the presence of an esterification catalyst, and the reaction is quenched before complete esterification is achieved. Careful monitoring of the reaction and/or control of the reaction time and temperature will allow production of a non-gelled coating composition that readily disperses in water and has excellent stability and cured film properties.

The carboxyl bearing polymer used in the method of the invention is typically a copolymer of ethylenically unsaturated monomers, including ethylenically unsaturated carboxylic acids. There should be enough carboxylic acid monomer in the carboxyl bearing polymer to insure that sufficient carboxyl groups are available to react with the oxirane groups of the epoxy resin reactant and have an excess of carboxyl groups remaining to form salts, thereby producing a water-dispersible product.

Suitable ethylenically unsaturated carboxylic acids include alkenoic and aralkenoic mono-, di- and tricarboxylic acids having a total of from 3 to 20 carbon atoms as well as acids having higher numbers of carboxyl groups. Examples of such useful acids include acrylic acid, methacrylic acid, fumaric acid, maleic acid, crotonic acid, itaconic acid and cinnamic acid. Of these, acrylic acid and methacrylic acid are preferred, with methacrylic acid especially preferred because of the high glass transition temperature (Tg) and hydrophobicity of polymers that contain relatively significant amounts of this monomer. The ethylenically unsaturated carboxylic acid monomer typically comprises about 35 to 75 wt % of the carboxyl bearing polymer, based on total monomer weight, preferably about 50 to 75 wt %, and most preferably about 65 to 75 wt %.

The remainder of the carboxyl bearing polymer comprises one or more ethylenically unsaturated monomers without a carboxylic acid group. Such "non-reactive" monomers may be used to control characteristics of the coating composition such as dispersibility, solubility, flexibility, flow and undesirable reactivity such as susceptibility to hydrolytic action. The amounts and types of these polymers are balanced with each other and with the carboxylic acid bearing monomer to obtain the specific desired properties.

Suitable classes of non-carboxyl containing ethylenically unsaturated monomers include alkyl esters of ethylenically unsaturated carboxylic acids that contain a total of 4 to 20 carbon atoms, such as acrylic and methacrylic acid; ethylenically unsaturated aromatic monomers that contain a total of 8 to 20 carbon atoms, such as styrene and vinyl toluene; ethylenically unsaturated esters of carboxylic acids that contain a total of 4 to 20 carbon atoms such as vinyl acetate; and the like.

Preferred non-carboxyl, or non-reactive, monomers include, for example, methyl acrylate, ethyl acrylate, n-butyl acrylate, isobutyl acrylate, methyl methacrylate, ethyl methacrylate, n-butyl methacrylate, isobutyl methacrylate, and styrene. Such monomers may comprise about 25 to 65 wt %, based on total monomer weight, of the carboxyl bearing polymer, preferably about 25 to 50 wt %, and most preferably about 25 to 35 wt %.

The carboxyl bearing polymer may be formed by polymerization methods well known in the art, such as solution polymerization using free radical initiators.

After polymerization, the carboxyl bearing polymer used in the method of the invention typically has a weight average molecular weight ($M_w$) of about 5,000 to 50,000, preferably about 10,000 to 20,000. The acid value (AV) of the carboxyl bearing polymer should be about 230 to 600.

The Epoxy Resin

The epoxy resin useful in the method of the invention is typically an aromatic polyether containing terminal oxirane functionality, the oxirane groups of which will react with the carboxyl groups of the carboxyl bearing polymer to form ester linkages between the resins.

Aromatic polyethers containing oxirane functionality are well known in the art and are commercially available. Such polyethers often are based on a bisphenol structure wherein the two aromatic groups are joined through a divalent hydrocarbon group. The most commonly used bisphenol is Bisphenol A, or 4,4'-isopropylidenediphenol. The epoxy resin is then prepared by reacting the bisphenol with liquid epoxy or epichlorohydrin.

Additional information on the preparation of epoxy resins may be found in H. Lee and K. Neville, *Handbook of Epoxy Resins*, TC Publications, 1982.

The epoxy resins useful in the invention have a number average molecular weight of about 4,000 to 6,000 and an epoxy equivalent weight of about 2,000 to 3,000, with an epoxy equivalent weight of about 2,200 to 2,300 preferred. The epoxy resins used in the process of the invention are fully functionalized, with an average epoxy functionality of about 2.

Catalyst

To insure reaction between the carboxyl groups of the carboxyl bearing polymer and the oxirane groups of the epoxy resin, the reaction is carried out in the presence of a catalyst. This catalyst may be any agent known to facilitate esterification of carboxylic acids and epoxy groups, but the preferred agents are tertiary alkanolamines. Useful tertiary alkanolamines include those of formula (I) below:

wherein $R^1$ and $R^2$ are independently $C_{1-6}$ alkyl and $R^3$ is $C_{1-6}$ alkyl-(OH). The alkyl groups may be straight or branched chain. The preferred esterification catalyst is dimethylethanolamine (DMEA).

The selected esterification catalyst is used in an amount effective to facilitate the esterification reaction, preferably about 0.02 to 0.07 wt % based on the total weight of the carboxyl functional and epoxide functional reactants, and more preferably about 0.04 to 0.06 wt %.

The Reaction

The esterification reaction of the invention is begun by first dissolving the epoxy resin in an appropriate organic solvent. While any organic solvent that does not interfere with the esterification reaction can be used, slightly to moderately hydrophilic hydroxylic solvents are preferred. Examples of such preferred solvents include butyl alcohol, isopropyl alcohol, butyl cellosolve, hexyl cellosolve, 2,2,4-trimethyl-1,3-pentanediol monoisobutyrate, and mixtures thereof. A mixture of butyl alcohol, butyl cellosolve and hexyl cellosolve is especially preferred. This combination provides suitable solvents for the reactants and the product, and promotes good coating flow properties. The epoxy resin and solvent are heated to facilitate dissolution of the resin. After dissolution, the temperature of the epoxy resin solution is brought to about 200° F. (94° C.) and the carboxyl bearing polymer is added slowly.

The proportion of epoxy to acrylic is a factor in the progress of the reaction, as this proportion plays an important role in determining the extent of the esterification reaction between the carboxy groups and the oxirane or epoxy groups. In general, a stoichiometric excess of carboxyl groups is desirable to achieve the desired ester linkages and have additional carboxyl groups available as quaternary ammonium salt sites. In the inventive process the stoichiometric ratio of oxirane groups to carboxyl groups may range from about 0.05:1 to 0.5:1, with about 0.1:1 to 0.25:1 preferred. The proportion of oxirane groups to carboxyl groups may also be expressed in terms of the solids content of the reaction mixture. If such a measure is used, then the proportion of epoxy resin to carboxyl bearing resin may be from about 60:40 to 90:10, preferably about 75:25 to 85:15, with a ratio of about 80:20 most preferred.

After the epoxy resin and the carboxyl bearing resin have been combined, the esterification catalyst described above is added. The preferred esterification catalyst is DMEA, used in an amount of about 0.04 to 0.06% by weight based on the total weight of carboxy functional and epoxy functional reactants.

The reaction is then allowed to proceed, and the progress of the reaction monitored. Generally, the gelation point is reached when there are sufficient di-esterified epoxy resin molecules to provide one diester molecule for every two carboxyl bearing polymer molecules, based on the weight average molecular weight of the carboxyl bearing polymer employed. The fraction of oxirane groups converted to ester groups at the point of gelation (x) may be expressed by means of formula $$x = \sqrt{\frac{\text{wt \% acrylic}}{100 - \text{wt \% acrylic}} \left(\frac{EEW}{MW}\right)} \quad (1)$$

wherein "wt % acrylic" represents the weight percentage of the carboxyl bearing polymer in the reaction mixture, "EEW" equals the epoxy equivalent weight of the epoxy resin and "MW" equals the weight average molecular weight of the carboxyl bearing polymer.

For best results, the esterification reaction should be allowed to proceed until the fraction of oxirane converted to ester is no more than about 90% of the theoretical gel point. More preferably, the reaction should be quenched at about 50 to 75% of the theoretical gel point. However, in no case should the reaction be allowed to exceed the fraction calculated by the gel point equation.

The reaction may be monitored by any method known in the art, such as by following the infrared spectrum, the acid value, the NMR spectrum, the gas chromatographs or mass spectrometry readings of the reaction mixture and the like. Acid value (AV) is defined as the number of milligrams or milliequivalents of KOH (potassium hydroxide) required to neutralize one gram of the substance in question. As the carboxyl groups of the carboxyl bearing polymer react with the oxirane groups of the epoxy resin to form ester linkages, the acid value of the reaction mixture will decrease because there will be fewer acid groups remaining to be neutralized by the KOH. Thus, monitoring the AV of the reaction mixture is one appropriate way to determine the progress of the esterification reaction.

If the progress of the reaction is followed by monitoring the AV of the reaction mixture, the initial AV of the reaction mixture should be determined and the theoretical AV of the mixture should be calculated for the reaction mixture at a time when the reaction has progressed to the gel point. The AV of the reaction mixture is monitored until a predetermined fraction of the theoretical AV is reached. This point is the desired AV of the reaction mixture at the completion of this phase of the process.

The theoretical AV at the gel point ($AV_{gel}$) may be calculated from formula (2):

$$AV_{gel} = AV_0 \left[ 1 - \left(\frac{\text{wt \% epoxy}}{\text{wt \% acrylic}}\right) \left(\frac{MW \text{ acid monomer}}{EEW \times \text{wt. fraction acid}}\right) x \right] \quad (2)$$

wherein x for the reaction mixture is calculated using formula (1); "wt. fraction acid" equals the weight fraction of acid employed in the carboxyl bearing polymer; "MW acid monomer" is the molecular weight of the acid monomer used; and $AV_o$ equals the initial AV of the reaction mixture before esterification begins. The reaction should be quenched before the AVgel is reached. Preferably, the reaction is quenched before the AV has decreased an amount that is about 90% of the difference between $AV_o$ and AVgel. More preferably the reaction is quenched when the AV has decreased an amount that is about 50% of this difference.

Alternatively, the desired end point of the esterification reaction can be obtained by controlling the time and temperature of the reaction mixture, so long as the gel point of the reaction is not reached. Such control allows the reaction to proceed so that it is unnecessary to take additional measurements such as the AV of the reaction mixture. For example, if the reaction mixture is allowed to react for about 90 to 105 minutes, preferably about 90 minutes, at about 240° to 245° F. (about 116° to 118° C.), the esterification reaction will generally proceed to the desired point.

Quenching the Reaction

When the reaction has proceeded to the desired point, the reaction mixture is quenched to prevent further reaction that could lead to gelation. In general, the reaction is quenched by adding a large excess of amine to the reaction mixture. The amine may be added in combination with water, if desired. The addition of excess amine to the reaction mixture interrupts the esterification reaction, causing quaternary ammonium salts of available carboxyl groups to form instead of esters. These quaternary ammonium salts improve the water dispersibility and storage stability of the coating composition.

Representative amines that may be used to quench the reaction include tertiary amines, including alkanol amines and alkyl amines wherein the alkyl groups may be straight or branched. The quenching agent may be the same as the catalyst, with the preferred quenching agent being DMEA. The quenching agent is typically used in large excess, such as about 4 to 8 wt % based on the total weight of the carboxyl functional and epoxide functional reactants, preferably about 5 to 7 wt %, and more preferably about 6 to 7 wt %.

As mentioned above, the quenching agent may be used alone or in combination with water. If the quenching agent is used alone, it may be added directly to the reaction mixture when the reaction is found to have reached the desired level of esterification. If a combination of quenching agent and water is used, they are generally first combined in a separate container before addition to the reaction mixture. The water/quenching agent mixture may also be heated prior to addition to the reaction mixture, in order to prevent a rapid decrease in the temperature of the reaction mixture.

The resulting mixture, containing quenching agent and water as well as epoxy resin, carboxyl bearing resin and esterification reaction product, is held at a time and temperature sufficient to allow formation of quaternary ammonium salts. The exact time will vary, but the mixture is held generally for about 30 to 90 minutes, preferably about 45 to 60 minutes. During this time the temperature is allowed to decrease freely.

After this holding period water is added to the water-dispersible composition, forming an aqueous dispersion. The amount of water added at this point is typically that which is sufficient to provide a final solids content of about 20%.

The product mixture is then filtered and the solids content is further adjusted with water, if necessary, to provide the viscosity that is desired for best application properties.

The coating may be applied by any procedure known in the art, including spray coating, roll coating, and the like. Preferably, the coating is applied to a substrate, for example, a metal sheet or coil or the interior of a metal can, by an airless spray. The coating is then cured, for example by heat curing.

The method and product of the invention is further illustrated by the following non-limiting examples. The particular materials, conditions, amounts and other details recited in these examples should not be construed as limiting this invention.

EXAMPLE 1

Preparation of Acrylic Polymer

The following ingredients were combined:

| Ingredient | Amount (Wt %) |
| --- | --- |
| Butyl alcohol | 29.50 |
| Butyl cellosolve | 19.63 |
| Hexamethoxymethylmelamine | 8.00 |

This mixture was heated to 245° F. In a separate vessel was combined:

| Ingredient | Amount (Wt %) |
| --- | --- |
| Methacrylic acid | 15.59 |
| Styrene | 21.47 |
| Ethyl acrylate | 2.38 |
| Benzoyl peroxide | 3.43 |

This second mixture was added to the first mixture at the rate of 300 ml/15 min. The reaction mixture was held for 3 hours at 240° F. The resulting product had a solids content of 49.7%.

EXAMPLE 2

Preparation of Coating Composition

To a 5000 ml flask was added a solid epoxy resin prepared from bisphenol A (336.2 g, 13.5 wt %), butyl cellosolve (91.9 g, 3.7 wt %), butyl alcohol (114.1 g, 4.6 wt %), and 2,2,4-trimethyl-1,3-pentanediol monoisobutyrate (23.9 g, 1.0 wt %). The flask was heated to 240°–245° F., at which point the epoxy resin dissolved. The temperature of the mixture was brought to 210° F. and the acrylic polymer of Example 1 (342.5 g, 13.7 wt %) was added over a 15 minute period. A catalytic amount of DMEA (0.325 g, 0.02 wt %) was added. The temperature of the reaction mixture was raised to 245° F. and held for 90 min. The temperature of the reaction mixture was then reduced to 190°–200° F. and held.

To a 3000 ml resin pot was added demineralized water (1075.8 g, 43.1 wt %) and DMEA (50.0 g, 2.0 wt %). The water/amine mixture was heated to 130° F. The epoxy/acrylic mixture prepared above was added to the water/amine mixture over a 20 minute period, and the mixture was held at 130°–140° F. for 1 hour. Water (461.0 g, 18.5 wt %) was added over 15 minutes and the mixture was held for 30 min. The product was filtered through a cheesecloth.

The product had 21.5% solids content and a No. 2 Zahn viscosity of 18.0" at 77° F.

EXAMPLE 3

Preparation of Coating Composition

To a 5000 ml flask was added a solid epoxy resin prepared from bisphenol A (336.2 g, 13.5 wt %), butyl cellosolve (91.9 g, 3.7 wt %), butyl alcohol (114.1 g, 4.6 wt %), and 2,2,4-trimethyl-1,3-pentanediol monoisobutyrate (23.9 g, 1.0 wt %). The flask was heated to 240°–245° F., at which point the epoxy resin dissolved. The temperature of the mixture was brought to 210° F. and the acrylic polymer of Example 1 (342.5 g, 13.7 wt %) was added over a 15 minute period. A catalytic amount of DMEA (0.325 g, 0.02 wt %) was added. The temperature of the reaction mixture was raised to 240°–242° F. and held for 90 minutes. The temperature of the reaction mixture was then reduced to 190°–200° F. and DMEA (50.0 g, 2.0 wt %) was added over a period of 15 minutes. The mixture was held at 200° F. for 45 minutes.

Demineralized water (768.4 g, 30.8 wt %) was added over a 15 minute period. The temperature of the reaction mixture was allowed to drop to 135° F. and held for 30 minutes. A second addition of water (768.4 g, 30.8 wt %) was added over a 15 minute period lowering the temperature to 105° F. and the reaction mixture was held for 30 minutes. The product was filtered through a cheesecloth.

The product had a 20.7% solids content and a No. 2 Zahn viscosity of 18.0" at 77° F.

The above specification, Examples, and data provide a complete description of the invention. Since many embodiments of the invention are possible without departing from the spirit and scope of the invention, the invention resides in the claims hereinafter appended.

I claim:

1. A method of preparing a water-dispersible epoxy resin coating composition comprising:

(a) reacting an epoxy polymer with a carboxyl bearing polymer in a stoichiometric ratio of oxirane to carboxyl groups of from about 0.05:1 to 0.5:1 in the presence of an esterification catalyst;

(b) quenching the reaction with an excess of tertiary amine before the esterification reaction is completed, wherein the reaction is quenched before the acid value of the reaction mixture has decreased an amount that is about 90% of the difference between the initial acid value and the theoritical acid value at the gel point; and (c) adding water to form an aqueous dispersion.

2. The method of claim 1 wherein the reaction takes place in an organic solvent.

3. The method of claim 1 wherein the reaction takes place in an organic solvent comprising butyl alcohol, hexyl cellosolve, butyl cellosolve, or a mixture thereof.

4. The method of claim 1 wherein the epoxy:acrylic ratio, expressed in terms of solids content, is about 60:40 to 90:10.

5. The method of claim 1 wherein the reaction is quenched when the acid value of the reaction mixture has decreased an amount that is about 50% or less of the difference between the initial acid value and the theoretical acid value at the gel point.

6. The method of claim 1 wherein the reaction is quenched when about 25 to 50% of the fraction of oxirane groups required to react for gel formation have been reacted.

7. The method of claim 1 wherein the reaction mixture formed in step (a) is held at a temperature of about 240° C. to 245° C. for about 30 to 90 minutes before quenching with tertiary amine.

8. The method of claim 1 wherein the esterification catalyst comprises a tertiary amine.

9. The method of claim 1 wherein the esterification catalyst comprises dimethylethanol amine.

10. The method of claim 1 wherein the carboxyl bearing polymer has an acid value of about 230 to about 600.

11. The method of claim 1 wherein the carboxyl bearing polymer comprises a copolymer of methacrylic acid, styrene and ethyl acrylate.

12. The method of claim 1 wherein the carboxyl bearing polymer has a weight average molecular weight of about 5,000 to about 50,000.

13. The method of claim 1 wherein the carboxyl bearing polymer contains about 15 to 70 wt %, based on total monomer weight, of styrene.

14. The method of claim 1 wherein the carboxyl bearing polymer contains about 30 to 75 wt %, based on total monomer weight, methacrylic acid.

15. The method of claim 1 wherein the epoxy polymer has an initial average functionality of about 2.0.

* * * * *